United States Patent
Underkofler et al.

(10) Patent No.: US 6,497,377 B2
(45) Date of Patent: Dec. 24, 2002

(54) TAPE GUIDE CLEANING MEMBER

(75) Inventors: Daniel W. Underkofler, Lafayette, CO (US); Roger H. Grow, Lafayette, CO (US); William T. Veno, Thornton, CO (US); Phillip M. Morgan, Berthoud, CO (US)

(73) Assignee: Storage Technology Corporation, Louisville, CO (US)

( * ) Notice: Subject to any disclaimer, the term of this patent is extended or adjusted under 35 U.S.C. 154(b) by 51 days.

(21) Appl. No.: 09/726,683

(22) Filed: Nov. 30, 2000

(65) Prior Publication Data

US 2002/0063182 A1 May 30, 2002

(51) Int. Cl.$^7$ .............................. G11B 15/66; G11B 5/41
(52) U.S. Cl. ..................................... 242/332.8; 360/128
(58) Field of Search .............................. 242/332.8, 332, 242/332.4, 335, 340, 615.2; 360/128, 130.31, 130.21; 15/DIG. 12, DIG. 13, 88.1

(56) References Cited

U.S. PATENT DOCUMENTS

| 5,461,529 A | * | 10/1995 | Clausen | 360/128 |
| 5,710,684 A | * | 1/1998 | Inoue et al. | 360/128 |
| 5,930,089 A | * | 7/1999 | Andersen | 360/128 |
| 6,021,026 A | | 2/2000 | Dallago | |
| 6,038,111 A | | 3/2000 | Thiessen et al. | |
| 6,067,211 A | | 5/2000 | Chliwnyj et al. | |
| 6,067,212 A | | 5/2000 | Poorman | |
| 6,252,739 B1 | * | 6/2001 | Todd et al. | 360/128 |
| 6,292,330 B1 | * | 9/2001 | Thiessen et al. | 360/128 |

FOREIGN PATENT DOCUMENTS

| EP | 0 439 375 A2 | * | 7/1991 | G11B/23/04 |
| JP | 6-274841 | * | 9/1994 | G11B/5/41 |

* cited by examiner

Primary Examiner—Donald P. Walsh
Assistant Examiner—Mark J. Beauchaine
(74) Attorney, Agent, or Firm—Brook & Kushman P.C.

(57) ABSTRACT

A tape drive for use with magnetic tape includes a drive body and a cleaning member supported by the drive body. The tape drive also includes a tape guide moveably associated with the drive body, such that the tape guide is moveable between a tape-unloaded position and a tape-loaded position. When the tape guide moves between the tape-unloaded position and the tape-loaded position, the tape guide engages the cleaning member such that the cleaning member may remove debris from the tape guide.

22 Claims, 4 Drawing Sheets

TAPE GUIDE CLEANING MEMBER

TECHNICAL FIELD

The invention relates to a cleaning member for cleaning tape path guides of a tape drive.

BACKGROUND ART

Magnetic tape is frequently used to store digital data thereon. Such tape may be housed in a tape cartridge that protects the tape from damage. A leader block attached to a free end of the tape is used to withdraw the tape from the cartridge for read/write operations.

Read/write operations are performed by a tape transport or tape drive that is configured to receive the cartridge. A threading mechanism, such as a threading or loading post, grabs the leader block and pulls it free from the cartridge. The threading mechanism then pulls the leader block into a slot in a take-up reel of the tape drive. Next, a plurality of tape guides or guide bearings rotate into use positions where they engage the tape. The guide bearings function to guide the tape across a longitudinal read/write head for data transfer operations, as the tape is driven through the tape drive and onto a hub of the take-up reel.

As the tape moves over the guide bearings, tape wear may occur, thereby generating tape debris. This debris may build up on the guide bearings, which may cause track following and read/write problems. Some debris may also end up between layers of tape as the tape is wound on the take-up reel.

A prior method of cleaning tape drives includes using a cleaning cartridge having a tape with an abrasive media. The tape is fed through the tape drive so as to remove or dislodge debris. Other methods include using moveable brushes to clean read/write heads, and manually disassembling and cleaning tape drives. These methods, however, do not provide for efficient and effective cleaning of guide bearings.

DISCLOSURE OF INVENTION

The present invention addresses the shortcomings of the prior art by providing a tape drive including a cleaning member that efficiently and effectively cleans debris from tape guides such as guide bearings.

Under the invention, a tape drive for use with magnetic tape includes a drive body and a cleaning member supported by the drive body. The tape drive also includes a tape guide moveably associated with the drive body, such that the tape guide is moveable between a tape-unloaded position and a tape-loaded position. When the tape guide moves between the tape-unloaded position and the tape-loaded position, the tape guide engages the cleaning member such that the cleaning member may remove debris from the tape guide.

In a preferred embodiment, the cleaning member is a brush having a plurality of bristles, and the tape guide includes a guide body on which the tape may travel, and a guide element disposed adjacent the guide body. Preferably, the guide element has an angled surface for directing bristles between the guide body and the guide element. With such a configuration, debris accumulation between the guide body and the guide element can be effectively reduced.

Furthermore, the tape guide preferably includes a guide body having a debris pocket for collecting debris. In the preferred embodiment, the guide body includes a guide surface and a top surface adjacent the guide surface, and the debris pocket is formed in the top surface. With such a configuration, debris accumulation between the guide body and the guide element can be further inhibited.

The tape drive may also include a mounting member connected to the drive body for mounting the cleaning member to the drive body. Preferably, the mounting member has a channel, and the cleaning member includes a base disposed in the channel. The tape drive may also include a retainer that is engageable with the mounting member for retaining the base in the channel.

Further under the invention, a method is provided for cleaning a tape guide of a tape drive, wherein the tape drive has a drive body and a cleaning member on the drive body. The method includes moving the tape guide across the cleaning member so as to remove debris from the tape guide.

These and other objects, features and advantages of the invention are readily apparent from the following detailed description of the best modes for carrying out the invention when taken in conjunction with the accompanying drawings.

BEST MODE FOR CARRYING OUT THE INVENTION

Figure 1:
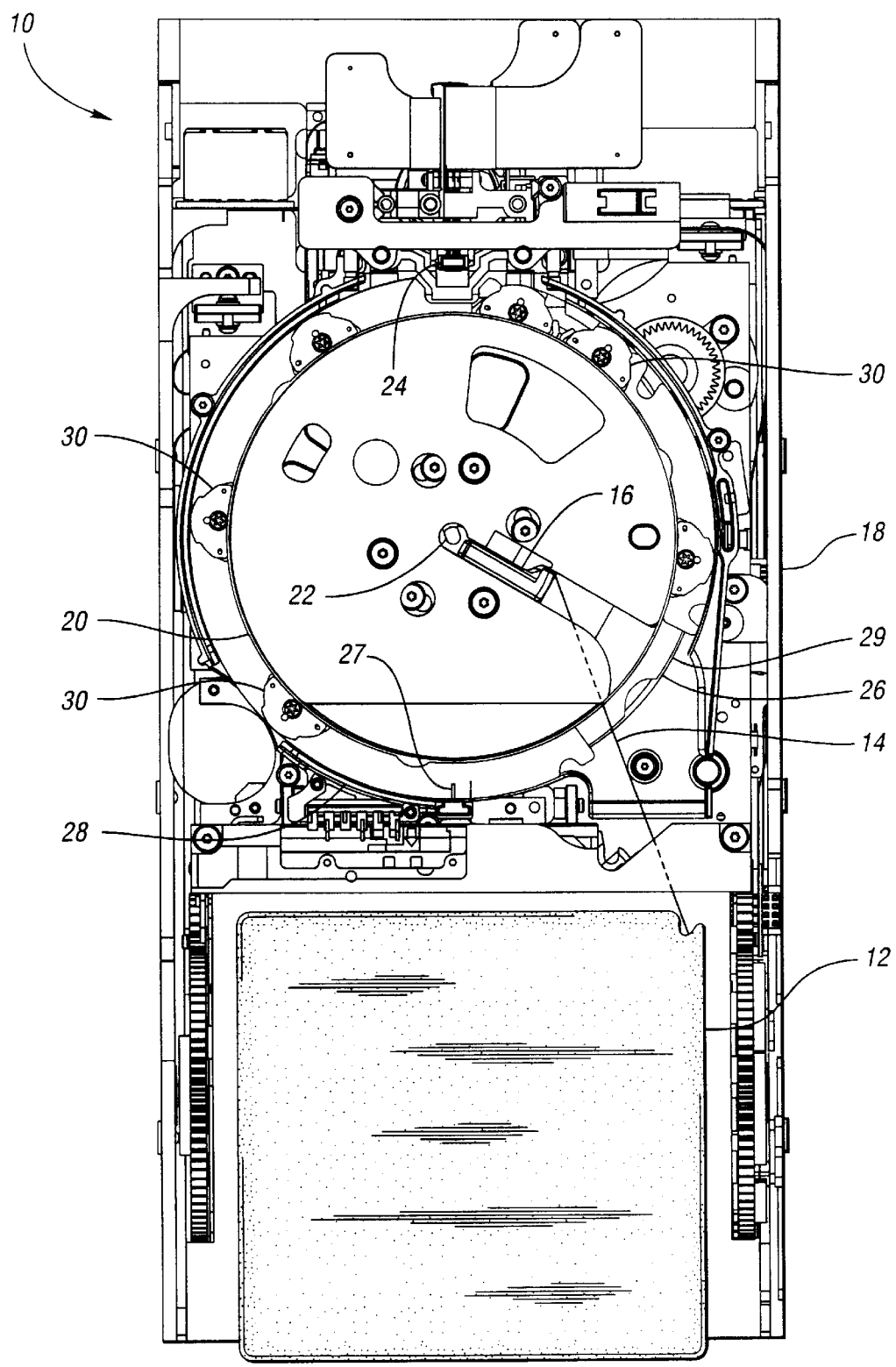
FIG. 1 is a top view of a tape drive according to the invention for use with a tape cartridge having magnetic tape wound on a supply reel, wherein the tape drive includes a drive body, a read/write head connected to the drive body, a plurality of guide bearings moveably associated with the drive body, and a cleaning member supported by the drive body, each guide bearing being shown in a respective tape-unloaded position.

FIG. 1 shows a tape drive 10 according to the present invention for use with a tape cartridge 12 having magnetic recording tape 14 wound on a supply reel. As is known in the art, a leader block 16 is attached to a free end of the tape 14. The tape drive 10 includes a drive body 18 that receives the tape cartridge 12, a take-up reel 20, and a threading mechanism, such as a threading or loading post 22, that is engageable with the leader block 16 for loading the tape 14 onto the take-up reel 20. The tape drive 10 further includes a read/write head 24 attached to the drive body 18 for performing read/write operations on the tape 14, a guide arrangement or tape path 26 for guiding the tape 14 through the tape drive 10, and a cleaning member 27 supported by the drive body 18 for cleaning the tape path 26. Preferably, the tape drive 10 also includes a spill guard 28 connected to the drive body 18, and the spill guard 28 functions to inhibit the tape 14 from spilling or otherwise migrating out of the tape path 26 should tension in the tape 14 loosen.

The tape path 26 includes a support member such as a ring 29, and a plurality of tape guides such as guide bearings 30 connected to the ring 29. The ring 29 is moveably associated with the drive body 18, such that each guide bearing 30 may be moved between a respective first or tape-unloaded position shown in FIG. 1, and a respective second or tape-loaded position shown in FIG. 2. Preferably, the ring 29 is rotatable with respect to the drive body 18 so as to move the guide bearings 30 between the tape-unloaded positions and the tape-loaded positions. With such a configuration, the tape 14 may first be loaded onto the take-up reel 20 by the loading post 22, and then the ring 29 may be rotated counterclockwise, for example, so as to move the guide bearings 30 to the tape-loaded positions, thereby loading the tape 14 onto the tape path 26. When the guide bearings 30 are in the tape-loaded positions, the guide bearings 30 engage the tape 14 and function to guide the tape 14 across the head 24 and through the drive body 10.

Figure 3:
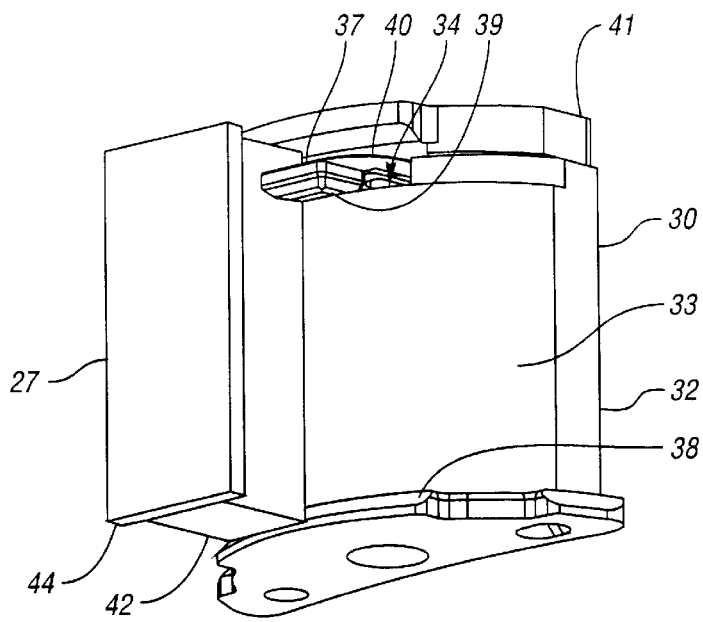
FIG. 3 is a perspective view of a guide bearing engaged with the cleaning member, wherein the guide bearing includes first and second guide elements, and a guide body disposed between the guide elements.
Figure 4:
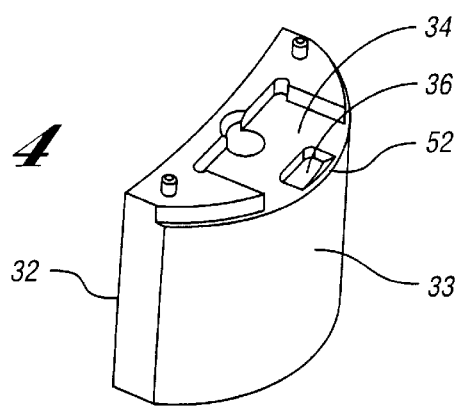
FIG. 4 is a perspective view of the guide body showing a debris pocket formed in a top surface of the guide body.

Referring to FIGS. 3 and 4, each guide bearing 30 includes a guide body 32 having a guide surface 33 on which the tape 14 may travel, and a top surface 34 disposed adjacent the guide surface 33. The top surface 34 is preferably provided with a debris pocket 36 for collecting debris, as explained below in greater detail.

Each guide bearing 30 further includes first and second guide elements 37 and 38, respectively, disposed at opposite ends of the guide body 32 such that the guide surface 33 is positioned between the guide elements 37 and 38. The first guide element 37, which may be referred to as a compliant guide button, includes an angled surface or chamfer 39 on each end. The first guide element 37 is also preferably moveably associated with the guide body 32, such that the first guide element 37 can exert a desired load on an edge of the tape 14 as the tape 14 travels over the guide surface 33. For example, the first guide element 37 may be connected to a flexible spring member 40 that is sandwiched between a retainer cap 41 and the guide body 32. Preferably, the first guide element 37 is biased toward the second guide element 38, which is fixed to the guide body 32. With such a configuration, the guide elements 37 and 38 are able to accurately guide the tape 14 over the guide surface 33. Alternatively, both guide elements 37 and 38 may be moveably associated with the guide body 32, or both guide elements 37 and 38 may be fixed to the guide body 32.

As the tape 14 moves through the tape drive 10 and engages the guide bearings 30, however, the tape 14 may wear, which results in tape debris. This debris may accumulate on the guide body 32 and guide elements 37 and 38. Debris that collects between the first guide element 37 and the top surface 34 may also lift the first guide element 37 off the edge of the tape 14, thereby preventing the first guide element 37 from exerting the desired load on the edge of the tape 14.

The cleaning member 27 is configured to effectively clean one or more of the guide bearings 30, as explained below in greater detail, so as to remove such debris. Referring to FIG. 3, the cleaning member 27 is preferably a brush including a bristle portion 42 connected to a base 44. The bristle portion 42 includes a plurality of individually displaceable bristles (not shown in FIG. 3) that extend from the base 44 and are engageable with the guide bearings 30. While the bristles may comprise any suitable material, the bristles preferably comprise natural nylon with no dies or additives. Furthermore, the bristle portion 42 preferably has a height at least as great as the height of the guide body 32 and guide elements 37 and 38. Alternatively, the cleaning member 27 may be any suitable cleaning device such as a pad.

Furthermore, the cleaning member 27 is preferably fixedly connected to the drive body 18 in any suitable manner. For example, the tape drive 10 may include a mounting member, such as a mounting bracket, connected to the drive body 18 and configured to receive the cleaning member 27. In a preferred embodiment, the spill guard 28 is configured to function as the mounting member.

Figure 5:
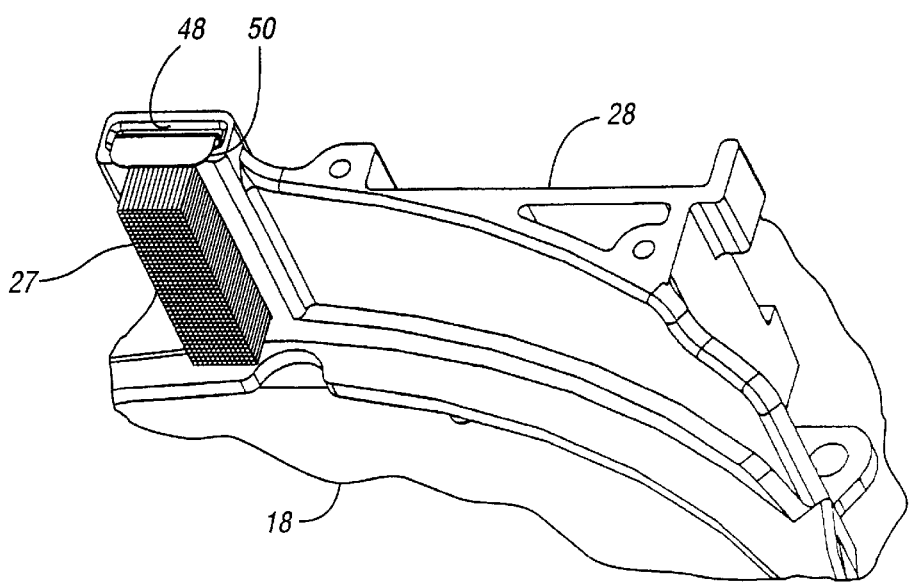
FIG. 5 is a fragmentary perspective view of a spill guard connected to the drive body, and including a channel for receiving the cleaning member.
Figure 6:
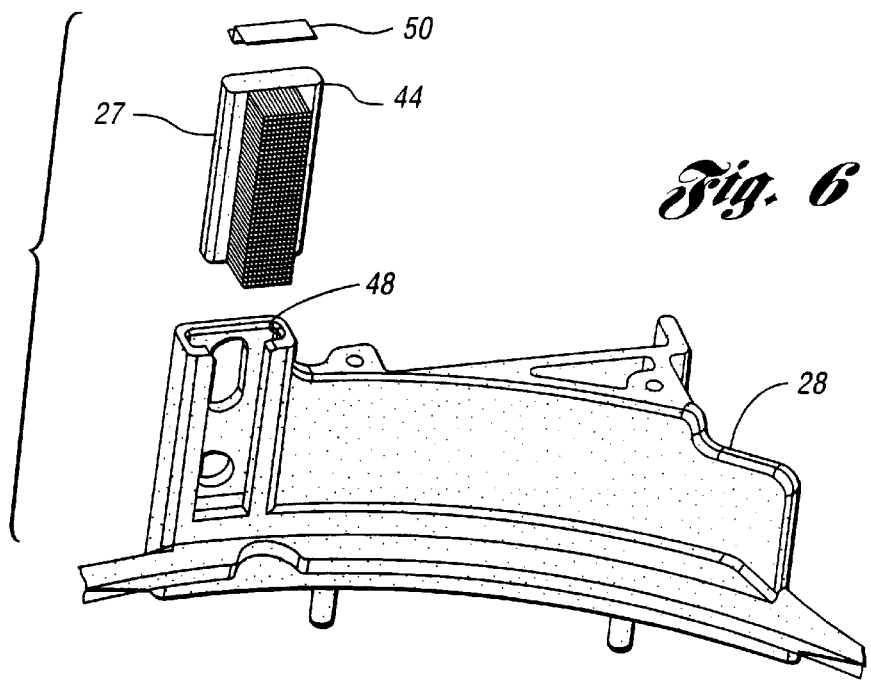
FIG. 6 is an exploded perspective view of the spill guard and cleaning member of FIG. 5.

Referring to FIGS. 1, 5 and 6, the spill guard 28 preferably has a channel 48 for receiving the base 44 of the cleaning member 28. The tape drive 10 may further include a retainer, such as a clip 50, that is engageable with the spill guard 28 for retaining the base 44 within the channel 48. Preferably, the clip 50 is at least partially disposable in the channel 48.

The cleaning member 27 cleans one or more of the guide bearings 30 when the guide bearings 30 move between the tape-unloaded positions and the tape-loaded positions. For example, after the tape 14 has been loaded onto the take-up reel 20 by the loading post 22, the ring 29 rotates approximately 360° so as to move the guide bearings 30 to their respective tape-loaded positions. It should be noted that the take-up reel 20 may also rotate as the ring 29 rotates, so as to facilitate loading of the tape 14 onto the tape path 26. As each guide bearing 30 moves to a corresponding tape-loaded position, the guide bearing 30 moves across the cleaning member 27. As a result, with reference to FIG. 3, the cleaning member 27 engages the guide surface 33 and guide elements 37 and 38 of each guide bearing 30, thereby effectively removing accumulated debris. Advantageously, as a particular guide bearing 30 moves across the cleaning member 27, the chamfer 39 of the respective first guide element 37 directs bristles between the first guide element 37 and the respective guide body 32, thereby facilitating removal of debris.

Figure 2:
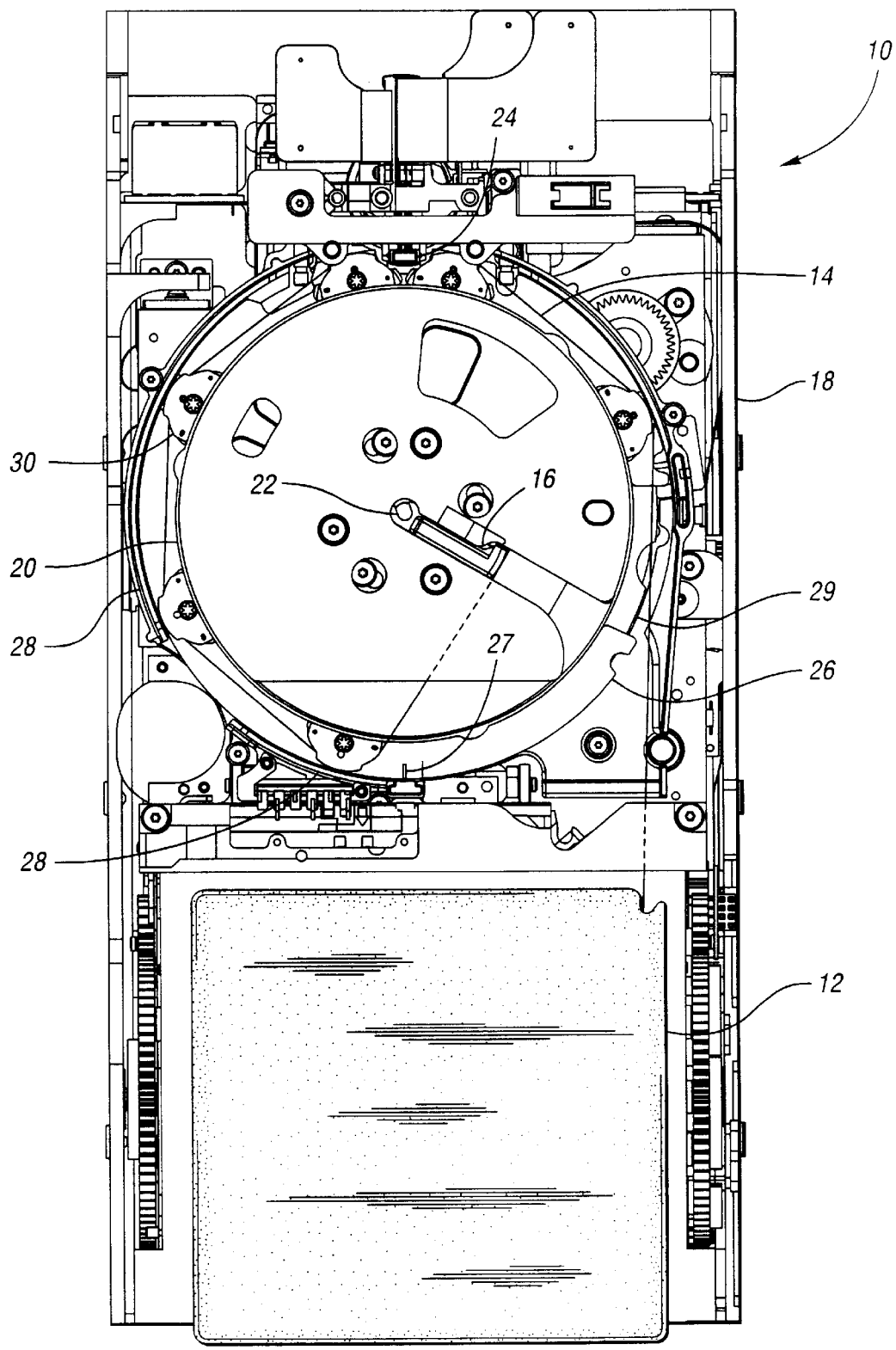
FIG. 2 is a top view of the tape drive showing each guide bearing in a respective tape-loaded position.

Preferably, the cleaning member 27 is positioned on the drive body 18 such that the cleaning member 27 will engage each guide bearing 30 prior to the guide bearing 30 engaging the tape 14. For example, as shown in FIGS. 1 and 2, the cleaning members 27 may be positioned proximate the tape cartridge 12. The tape drive 10 may also be provided with one or more additional cleaning members for cleaning the ring 29 and/or guide bearings 30.

Furthermore, each debris pocket 36 may help to reduce displacement of a respective first guide element 37 caused by accumulated debris. For example, each debris pocket 36 is located sufficiently close to a respective guide surface 33, such that debris which collects between a respective first guide element 37 and a respective guide body 32 will fall into the debris pocket 36, rather than displacing the first guide element 37. Preferably, each debris pocket 36 is located immediately adjacent a respective guide surface 33. In the embodiment shown in FIG. 4, a narrow land 52 exists between the debris pocket 36 and the guide surface 33. The land 52 is sufficiently narrow so as to inhibit accumulation of debris between the land 52 and the first guide element 37. For example, the land 52 may have a width in the range of 0 to 0.5 millimeters.

Because the cleaning member 27 effectively and efficiently removes debris from the tape path 26, the tape path 26 is able to accurately guide the tape 14 through the tape drive 10. Advantageously, the cleaning member 27 cleans the tape path 26 when the guide bearings 30 move from the tape-unloaded positions to the tape-loaded positions, and also when the guide bearings 30 move from the tape-loaded positions back to the tape-unloaded positions.

Figure 7:
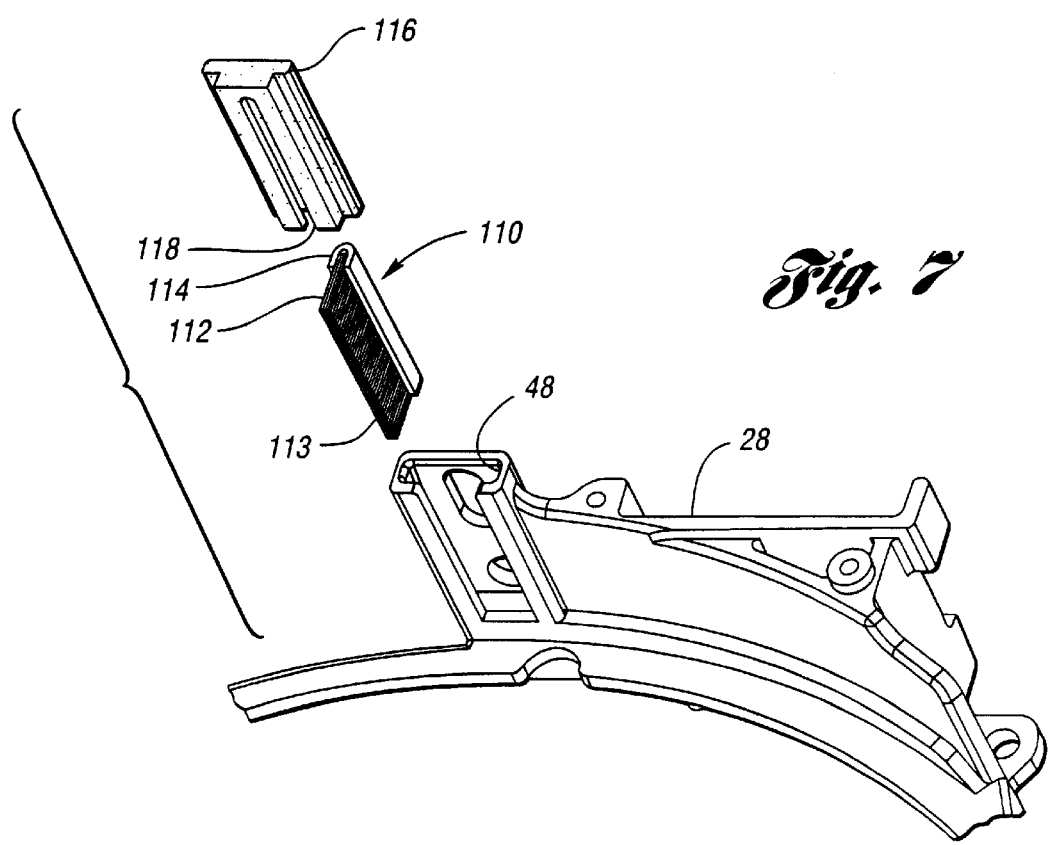
FIG. 7 is an exploded perspective view of the spill guard and an alternative embodiment of the cleaning member.

FIG. 7 shows an alternative embodiment 110 of the cleaning member. The cleaning member 110 includes a narrow bristle portion 112 connected to a base 114. The bristle portion 112 includes a plurality of bristles 113 that preferably comprise natural nylon or other suitable material. The base 114 may comprise any suitable material, and is preferably formed around the bristle portion 112. For example, the base 114 may be an aluminum member that is crimped about the bristle portion 112.

Similar to the cleaning member 27, the base 114 of the cleaning member 110 is disposable in the channel 48 of the spill guard 28. A retainer 116 is also disposable in the channel 48 spill guard 28. A retainer 116 is also disposable in the channel 48 for retaining the base portion 114 in the channel 48. Preferably, the retainer 116 has a groove 118 for receiving the base 114. While the retainer 116 may comprise any suitable material, the retainer 116 preferably comprises molded plastic.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A tape drive for use with magnetic tape, the tape drive comprising:
   a drive body;
   a cleaning member supported by the drive body; and
   a tape guide moveably associated with the drive body, the tape guide being moveable between a tape-unloaded position and a tape-loaded position, wherein when the tape guide moves between the tape-unloaded position and the tape-loaded position, the tape guide engages the cleaning member such that the cleaning member may remove debris from the tape guide.

2. The tape drive of claim 1 wherein the cleaning member is a brush having a plurality of bristles, and wherein the tape guide includes a guide body on which the tape may travel, and a guide element adjacent the guide body, the guide element having an angled surface for directing bristles between the guide body and the guide element.

3. The tape drive of claim 2 wherein the guide element is moveable with respect to the guide body.

4. The tape drive of claim 1 wherein the cleaning member is a pad.

5. The tape drive of claim 1 wherein the tape guide has first and second guide elements and a guide surface disposed between the guide elements, and wherein the cleaning member engages the guide elements and the guide surface when the tape guide moves between the tape-unloaded position and the tape-loaded position.

6. The tape drive of claim 1 wherein the tape guide includes a guide body on which the tape may travel, and the guide body includes a debris pocket for collecting debris.

7. The tape drive of claim 6 wherein the guide body includes a guide surface and a top surface adjacent the guide surface, wherein the pocket is formed in the top surface.

8. The taped drive of claim 7 wherein the top surface defines a narrow land disposed between the pocket and the guide surface.

9. The tape drive of claim 1 wherein the cleaning member is fixedly secured to the drive body.

10. The tape drive of claim 1 wherein the tape drive further includes a mounting member supported by the drive body and having a channel, and the cleaning member includes a base disposed in the channel.

11. The tape drive of claim 10 wherein the mounting member is a spill guard that is connected to the drive body.

12. The tape drive of claim 10 further comprising a retainer that is engageable with the mounting member for retaining the base of the cleaning member in the channel.

13. The tape drive of claim 1 wherein the tape guide includes a guide body on which the tape may travel, and a guide element adjacent the guide body, the guide element being moveable with respect to the guide body.

14. The tape drive of claim 1 further comprising a support ring moveably associated with the drive body, wherein the tape guide is connected to the support ring.

15. The tape drive of claim 1 further comprising a take-up reel moveably associated with the drive body and configured to receive the tape, and a support ring extending radially beyond the take-up reel and being moveably associated with the drive body, wherein the tape guide is connected to the support ring such that the tape guide is moveable with the support ring.

16. The tape drive of claim 1 further comprising an additional tape guide moveably associated with the drive body such that the additional tape guide is moveable between a tape-unloaded position and a tape-loaded position, wherein the additional tape-guide is engageable with the cleaning member when the additional tape guide moves between the tape-unloaded position and the tape-loaded position.

17. The tape drive of claim 16 further comprising a support ring moveably associated with the drive body, wherein the tape guide and the additional tape guide are connected to the support ring.

18. A tape drive for use with magnetic tape, the tape drive comprising:
   a drive body;
   a mounting member connected to the drive body and having a channel;
   a cleaning brush having a base and a plurality of bristles connected to the base, the base being disposed in the channel; and
   a plurality of tape guides moveably associated with the drive body such that each tape guide is moveable between a tape-unloaded position and a tape-loaded position, each tape guide having first and second guide elements and a guide body disposed between the guide elements, each first guide element having an angled surface disposed adjacent a respective guide body, each guide body having a guide surface on which the tape may travel, and a top surface adjacent the guide surface, each top surface defining a debris pocket;
   wherein when the tape guides move between the tape-unloaded positions and the tape-loaded positions, the cleaning brush engages each tape guide, and each angled surface directs some of the bristles between a respective first guide element and a respective guide body.

19. A method for cleaning a tape guide of a tape drive, wherein the tape drive has a drive body and a cleaning member on the drive body, and wherein the tape guide is moveable between a tape-unloaded position and a tape-loaded position, the method comprising moving the tape guide between the tape-unloaded position and the tape-loaded position such that the tape guide moves across the cleaning member so as to remove debris from the tape guide.

20. It The method of claim 19 wherein the cleaning member is a brush having a plurality of bristles, and the tape guide has a guide body on which tape may travel, and a guide element disposed adjacent the guide body, and wherein the step of moving the tape guide comprises moving the tape guide across the brush such that bristles of the brush are directed between the guide body and the guide element.

21. The method of claim 19 wherein the cleaning member is connected to a support ring, and the step of moving the tape guide comprises rotating the support ring.

22. A method for cleaning a tape guide of a tape drive, wherein the tape drive has a drive body and a brush on the drive body, the brush having a plurality of bristles, the tape guide having a guide body on which tape may travel, and a guide element disposed adjacent the guide body, the method comprising moving the tape guide across the brush so as to remove debris from the tape guide and such that bristles of the brush are directed between the guide body and the guide element.

\* \* \* \* \*